US012786111B2

(12) United States Patent
Zhao et al.

(10) Patent No.: US 12,786,111 B2
(45) Date of Patent: Nov. 3, 2026

(54) METHOD FOR QUALITY OF SERVICE PROCESSING OF NETWORK DATA PACKET, AND ELECTRONIC DEVICE AND NON-TRANSITORY COMPUTER-READABLE MEDIUM

(71) Applicant: JINGDONG TECHNOLOGY INFORMATION TECHNOLOGY CO., LTD., Beijing (CN)

(72) Inventors: Xiaoqiang Zhao, Beijing (CN); Wei Zhang, Beijing (CN); Chunming Sun, Beijing (CN); Yahui Chen, Beijing (CN); Jianxing Zhao, Beijing (CN)

(73) Assignee: Jingdong Technology Information Technology Co., Ltd., Beijing (CN)

(*) Notice: Subject to any disclaimer, the term of this patent is extended or adjusted under 35 U.S.C. 154(b) by 26 days.

(21) Appl. No.: 18/858,740

(22) PCT Filed: Dec. 22, 2022

(86) PCT No.: PCT/CN2022/141159
§ 371 (c)(1),
(2) Date: Oct. 21, 2024

(87) PCT Pub. No.: WO2023/207161
PCT Pub. Date: Nov. 2, 2023

(65) Prior Publication Data

US 2025/0274384 A1 Aug. 28, 2025

(30) Foreign Application Priority Data

Apr. 29, 2022 (CN) ......................... 202210494011.4

(51) Int. Cl.
*G06F 15/173* (2006.01)
*H04L 45/302* (2022.01)
(Continued)

(52) U.S. Cl.
CPC ............ *H04L 45/302* (2013.01); *H04L 45/74* (2013.01); *H04L 69/162* (2013.01)

(58) Field of Classification Search
CPC ...... H04L 45/302; H04L 45/74; H04L 69/162
(Continued)

(56) References Cited

U.S. PATENT DOCUMENTS 7,359,984 B1 * 4/2008 Hackney ............... H04L 45/302 709/238
8,073,968 B1 * 12/2011 Shah ....................... H04L 45/04 709/238
(Continued)

FOREIGN PATENT DOCUMENTS

CA 3110193 A1 8/2013
CN 102098227 A 6/2011
(Continued)

OTHER PUBLICATIONS

International Search Report dated Feb. 20, 2023 of International Application No. PCT/CN2022/141159.
(Continued)

*Primary Examiner* — Bharat Barot
(74) *Attorney, Agent, or Firm* — Qinghong Xu

(57) ABSTRACT

A method for quality of service processing of a network data packet, including: invoking a data packet filtering module to obtain a type of service field value corresponding to a
(Continued)

socket; caching the type of service field value into metadata of the socket; and performing a packaging processing on the network data packet after routing based on the cached type of service field value. (FIG. 2)

17 Claims, 3 Drawing Sheets

(51) Int. Cl.
*H04L 45/74* (2022.01)
*H04L 69/16* (2022.01)

(58) Field of Classification Search
USPC .................................. 709/202–203, 238–239
See application file for complete search history.

(56) References Cited

U.S. PATENT DOCUMENTS

| | | | | |
|---|---|---|---|---|
| 9,270,605 | B2 * | 2/2016 | Izhak-Ratzin | H04L 69/22 |
| 11,438,448 | B2 * | 9/2022 | Hsu | H04L 69/26 |
| 11,677,585 | B2 * | 6/2023 | Ponaka | H04L 12/4633 370/254 |
| 2005/0190692 | A1 | 9/2005 | Singh et al. | |
| 2006/0077951 | A1 | 4/2006 | Godas | |
| 2009/0296685 | A1 * | 12/2009 | O'Shea | H04L 69/32 370/351 |
| 2010/0325287 | A1 * | 12/2010 | Jagadeeswaran | H04L 67/02 709/227 |
| 2013/0132607 | A1 * | 5/2013 | Sinha | H04L 45/76 709/238 |
| 2014/0043964 | A1 | 2/2014 | Gabriel et al. | |
| 2014/0112278 | A1 | 4/2014 | Liang et al. | |
| 2014/0269724 | A1 * | 9/2014 | Mehler | H04L 45/30 370/401 |
| 2017/0094034 | A1 | 3/2017 | Banerjee et al. | |
| 2019/0132377 | A1 | 5/2019 | Hulick, Jr. et al. | |
| 2021/0021531 | A1 * | 1/2021 | Liu | H04L 47/2433 |
| 2021/0392076 | A1 | 12/2021 | Prodoehl et al. | |
| 2023/0088222 | A1 * | 3/2023 | Tangudu | H04L 12/66 370/230 |

FOREIGN PATENT DOCUMENTS

| | | | |
|---|---|---|---|
| CN | 102143035 | A | 8/2011 |
| CN | 102739523 | A | 10/2012 |
| CN | 104426873 | A | 3/2015 |
| CN | 111884930 | A | 11/2020 |
| CN | 112153013 | A | 12/2020 |
| CN | 112256542 | A | 1/2021 |
| CN | 112751775 | A | 5/2021 |
| CN | 113301007 | A | 8/2021 |
| CN | 113934604 | A | 1/2022 |
| CN | 114334051 | A | 4/2022 |
| CN | 114338820 | A | 4/2022 |
| CN | 114979303 | A | 8/2022 |
| KR | 20060063364 | A | 6/2006 |

OTHER PUBLICATIONS

1st Office Action dated Sep. 20, 2023 of Chinese Application No. 202210494011.4.

Notice of Allowance dated Jan. 18, 2024 of Chinese Application No. 202210494011.4.

1st Office Action dated Feb. 28, 2026 of Singaporean Application No. 11202407348Q.

Mikailangjiyang, Accelerating Socket Performance with eBPF Sockmap and Redirection (2020), published on Feb. 25, 2021, https://cloud.tencent.com/developer/article/1793155.

* cited by examiner

METHOD FOR QUALITY OF SERVICE PROCESSING OF NETWORK DATA PACKET, AND ELECTRONIC DEVICE AND NON-TRANSITORY COMPUTER-READABLE MEDIUM

CROSS REFERENCE TO RELATED APPLICATIONS

The present disclosure a U.S. National Stage of International Application No. PCT/CN2022/141159, filed on Dec. 22, 2022, and claims priority to Chinese Patent Application No. 202210494011.4 entitled "Method and apparatus for quality of service processing of network data packet, device, and readable Medium", filed on 29 Apr. 2022, the entire contents of both of which are incorporated herein by reference.

TECHNICAL FIELD

The present disclosure relates to the field of network technology, and in particular, to a method and apparatus for quality of service processing of a network data packet, a device, and a non-transitory computer-readable medium.

BACKGROUND

At present, if a user wants to set a type of service (ToS) of a certain connection, in addition to invoking a socket setting function (setsockopt) in the code, the user mainly performs the setting through the ToS parameter of the Mangle table of the iptables, where the iptables is an information packet (IP) filtering system integrated with the latest Linux kernel of 3.5 version. It should be noted that the information disclosed in the above background part is only used to enhance the understanding of the background of the present disclosure, and therefore may include information that does not constitute the related art known to those of ordinary skill in the art.

SUMMARY

According to a first aspect of the embodiments of the present disclosure, there is provided a method for quality of service processing of a network data packet, including: invoking a data packet filtering module to obtain a type of service field value corresponding to a socket; caching the type of service field value into metadata of the socket; and performing a packaging processing on the network data packet after routing based on the cached type of service field value.

In some embodiments of the present disclosure, before invoking the data packet filtering module to obtain the type of service field value corresponding to the socket, the method further includes: adding the data packet filtering module in a kernel mode, where the data packet filtering module is configured to update a type of service field chart of a user mode; adding an invoking point of the data packet filtering module in a quality of service processing course for a network data packet of a protocol stack in the kernel mode, and invoking the data packet filtering module at the invoking point through the socket after a first routing to obtain the type of service field value and cache the type of service field value into the metadata of the socket; where the type of service field chart includes a corresponding relationship between a quadruple of the network data packet and the type of service field value.

In some embodiments of the present disclosure, the method further includes: triggering a configuration file or a command line parameter corresponding to the network data packet in the user mode to determine the corresponding relationship; and writing the corresponding relationship into the type of service field chart.

In some embodiments of the present disclosure, the method further includes: determining a type of service field value of the network data packet after packaging; and performing a classification control processing on the network data packet after packaging according to the type of service field value.

In some embodiments of the present disclosure, the data packet filtering module includes an eBPF module.

In some embodiments of the present disclosure, the type of service field value includes a ToS value.

In some embodiments of the present disclosure, the quadruple is a source IP address, a source port, a target IP address, and a target port corresponding to the network data packet.

According to a second aspect of the present disclosure, there is provided an electronic device, including: a memory; and a processor, coupled to the memory, where the processor is configured to perform the method according to any one of the above based on an instruction stored in the memory.

According to a third aspect of the present disclosure, there is provided a computer-readable storage medium; a program is stored the computer-readable storage medium; when the program is executed by a processor, the method for quality of service processing of a network data packet according to any one of the above is implemented.

It should be understood that both the foregoing general description and the following detailed description are exemplary and explanatory only, and are not limitations on the present disclosure.

DETAILED DESCRIPTION

Figure 1:
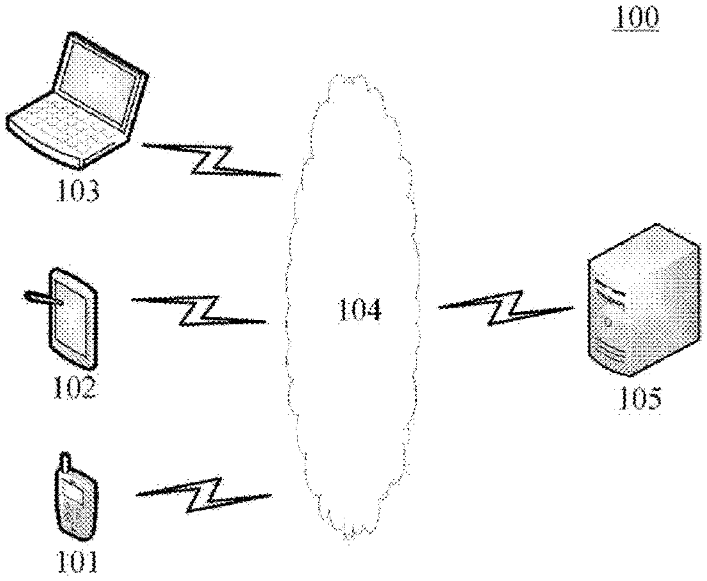
FIG. 1 is a schematic diagram of an example system architecture in which a solution for quality of service processing of a network data packet according to some embodiments of the present disclosure may be applied.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The described features, structures, or characteristics may be combined in any suitable manner in one or more embodiments. In the following description, numerous specific details are provided to give a thorough understanding of the embodiments of the present disclosure. However, those skilled in the art will appreciate that the technical solutions of the present disclosure may be practiced without one or more of the specific details, or other methods, components, apparatuses, steps, or the like, may be employed. In other instances, common-known technical solutions are not shown or described in detail to avoid blurring various aspects of the present disclosure due to a reversal of the order of host and guest.

In addition, the accompanying drawings are merely schematic diagrams of the present disclosure, and the same reference numerals in the drawings represent the same or similar parts, and therefore repeated description of them will be omitted. Some block diagrams shown in the accompanying drawings are functional entities, and do not necessarily correspond to physically or logically independent entities. These functional entities may be implemented in software form, or implemented in one or more hardware modules or integrated circuits, or implemented in different networks and/or processor devices and/or microcontroller devices.

In the related art, although the type of service field value can be set by invoking the setsockopt in the code, the type of service field value cannot be dynamically modified once compiled into a binary. If the type of service field value is to be modified, the source code must be re-modified, so as to realize re-compiling.

The operation of performing re-packaging on the data packet through the Mangle table include modifying the fields such as the type of service (ToS) and the time to live (TTL). Setting the type of service field value through the iptables is implemented by dynamically modifying the ToS field in the IP header when each sent packet passes through the Mangle table. This is needed to modify and re-package the type of service field value of each network data packet that satisfies the modification requirement before it can be sent. When the traffic of the network data packet is large, the overhead for setting the type of service field value may also be correspondingly increased, and a certain burden is brought to the network system.

An objective of the present disclosure is to provide a method and apparatus for quality of service processing of a network data packet, a device, and a readable medium, which are used to at least overcome the problem of a large overhead of the network for updating a type of service field value due to limitations and defects of the related art, to a certain extent.

FIG. 1 shows a schematic diagram of an example system architecture in which a solution for quality of service processing of a network data packet according to some embodiments of the present invention may be applied.

As shown in FIG. 1, the system architecture 100 may include one or more of terminal devices 101, 102, and 103, a network 104 and a server 105. The network 104 is configured to provide a medium for a communication link between the terminal devices 101, 102, 103 and the server 105. The network 104 may include various types of connection, such as wired connection, wireless communication links, optical fiber cables, or the like.

It should be understood that the numbers of the terminal device, the network, and the server in FIG. 1 are merely illustrative. Any number of the terminal device, the network, and the server may be provided according to implementation needs. For example, the server 105 may be a server cluster composed of a plurality of servers, or the like.

The user may use the terminal devices 101, 102, and 103 to interact with the server 105 through the network 104 to receive or send messages. The terminal devices 101, 102, and 103 may be various electronic devices having a display screen, including but not limited to a smart phone, a tablet computer, a portable computer, a desktop computer, etc.

In some embodiments, the method for quality of service processing of a network data packet provided according to embodiments of the present disclosure is generally performed by the terminal device. Correspondingly, the apparatus for quality of service processing of a network data packet is generally disposed in the terminal device 103 (or may be the terminal device 101 or 102). In some other embodiments, some servers may have similar functions to the terminal device to perform the method. Therefore, the method for quality of service processing of a network data packet provided according to the embodiments of the present invention is not limited to being performed by the terminal device.

The example embodiments of the present disclosure are described below in detail with reference to the accompanying drawings.

Figure 2:
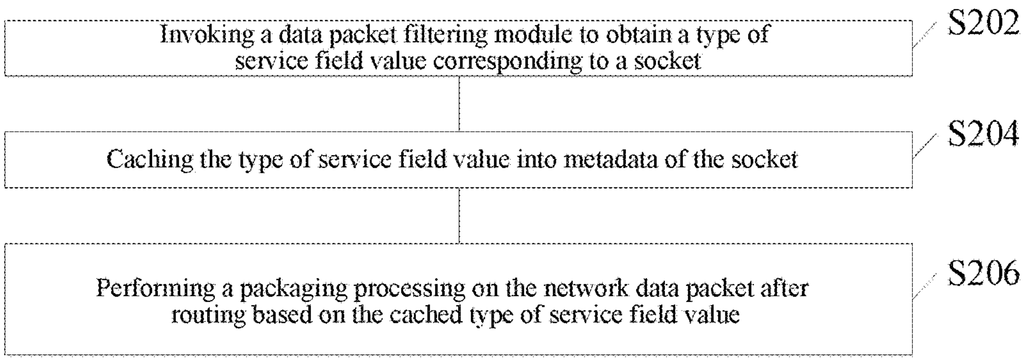
FIG. 2 is a flowchart of a method for quality of service processing of a network data packet according to some embodiments of the present disclosure.

FIG. 2 is a flowchart of a method for quality of service processing of a network data packet according to some embodiments of the present disclosure.

Referring to FIG. 2, the method for quality of service processing of a network data packet may include following steps.

In step S202, a data packet filtering module is invoked to obtain a type of service field value corresponding to a socket.

In step S204, the type of service field value is cached into metadata of the socket.

In step S206, a packaging processing is performed on the network data packet after routing based on the cached type of service field value.

In the embodiments of the present disclosure, the type of service field value corresponding to the socket is obtained by invoking the data packet filtering module, and the type of service field value is cached in the metadata of the socket, so that the packaging processing is performed on the network data packet after routing based on the cached type of service field value. Compared with setting according to packet in the related art, the technical solution of the present disclosure realizes setting of the type of service field according to stream, thus improving the efficiency and flexibility for updating the type of service field, reducing the overhead required for updating the type of service field value, and reducing the interaction pressure of the network data packet.

The various steps of the method for quality of service processing of the network data packet are described in detail below.

Figure 3:
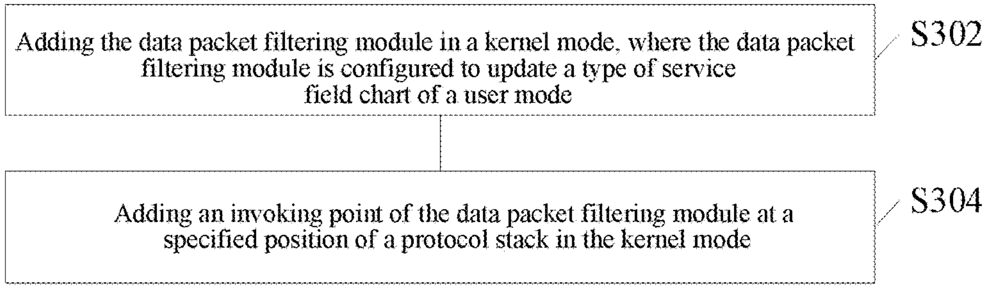
FIG. 3 is a flowchart of another method for quality of service processing of a network data packet according to some embodiments of the present disclosure.

In some embodiments of the present disclosure, as shown in FIG. 3, before invoking the data packet filtering module to obtain the type of service field value corresponding to the socket, the method further includes following steps.

In step S302, the data packet filtering module is added in a kernel mode, where the data packet filtering module is configured to update a type of service field chart of a user mode.

In step S304, an invoking point of the data packet filtering module is added in a quality of service processing course for a network data packet of a protocol stack in the kernel mode; and after a first routing, the data packet filtering module is invoked at the invoking point through the socket to obtain the type of service field value and cache the type of service field value into the metadata of the socket, where the type of service field chart includes a corresponding relationship between a quadruple of the network data packet and the type of service field value. In an embodiment of the present disclosure, the data packet filtering module is implemented based on eBPF, and the type of service field is implemented based on TOS. In the embodiments of the present disclosure, it is only needed to set the type of service field value for one time, add the eBPF invoking point in the kernel before packaging, and set the TOS field in the IP header according to the data in the map by invoking the data packet filtering module. For a same socket, the ToS value may be cached in the metadata of the socket. In addition to the first setting, the cached value may be automatically used for the later type of service field value, so as to implement setting of the type of service field value according to stream. Based on this, the logic of obtaining the ToS value may be modified at any time, because the eBPF program may be updated separately without modifying the kernel, which has greater flexibility.

Figure 4:
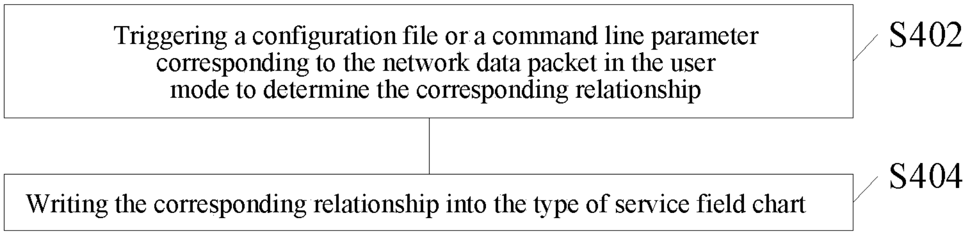
FIG. 4 is a flowchart of another method for quality of service processing of a network data packet according to some embodiments of the present disclosure.

In some embodiments of the present disclosure, as shown in FIG. 4, the method for quality of service processing of a network data packet further includes following steps.

In step S402, a configuration file or a command line parameter corresponding to the network data packet in the user mode is triggered to determine the corresponding relationship between the quadruple of the network data packet and the type of service field value.

In step S404, the corresponding relationship is written into a type of service field chart.

In the above embodiments, by reading the configuration file or through the command line parameter, the user mode writes the corresponding relationship between the quadruple and the type of service field value into the type of service field chart through the system invoking. It needs to support common operations such as adding, deleting, querying, and modifying. That is, the user mode may modify the type of service field value of a certain socket connection at any time, the modification may take effect immediately, and the quadruple information and the corresponding type of service field value are saved in eBPFmap. When the connection is established for the first time, the eBPF program may be invoked by the kernel code to query the map, and the type of service field value may be obtained and then written into the IP header of the type of service field value.

Figure 5:
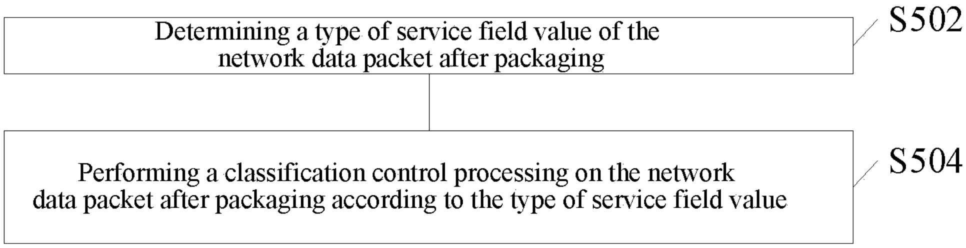
FIG. 5 is a flowchart of another method for quality of service processing of a network data packet according to some embodiments of the present disclosure.

In some embodiments of the present disclosure, as shown in FIG. 5, the method for quality of service processing of the network data packet further includes following steps.

In step S502, a type of service field value of the network data packet after packaging is determined.

In step S504, a classification control processing is performed on the network data packet after packaging according to the type of service field value.

In some embodiments of the present disclosure, the data packet filtering module includes an eBPF module.

In the above embodiments, the quality of service (QOS) service based on eBPF is a main means for performing classification control on IP traffic, and different service requirements may be distinguished and monitored by adding a type of service (ToS) field to the IP header.

In some embodiments of the present disclosure, the type of service field value includes a ToS value.

In some embodiments of the present disclosure, the quadruple is a source IP address, a source port, a target IP address, and a target port corresponding to the network data packet.

Corresponding to the above method embodiments, the present disclosure further provides an apparatus for quality of service processing of a network data packet, which may be configured to perform the above method embodiments.

Figure 6:
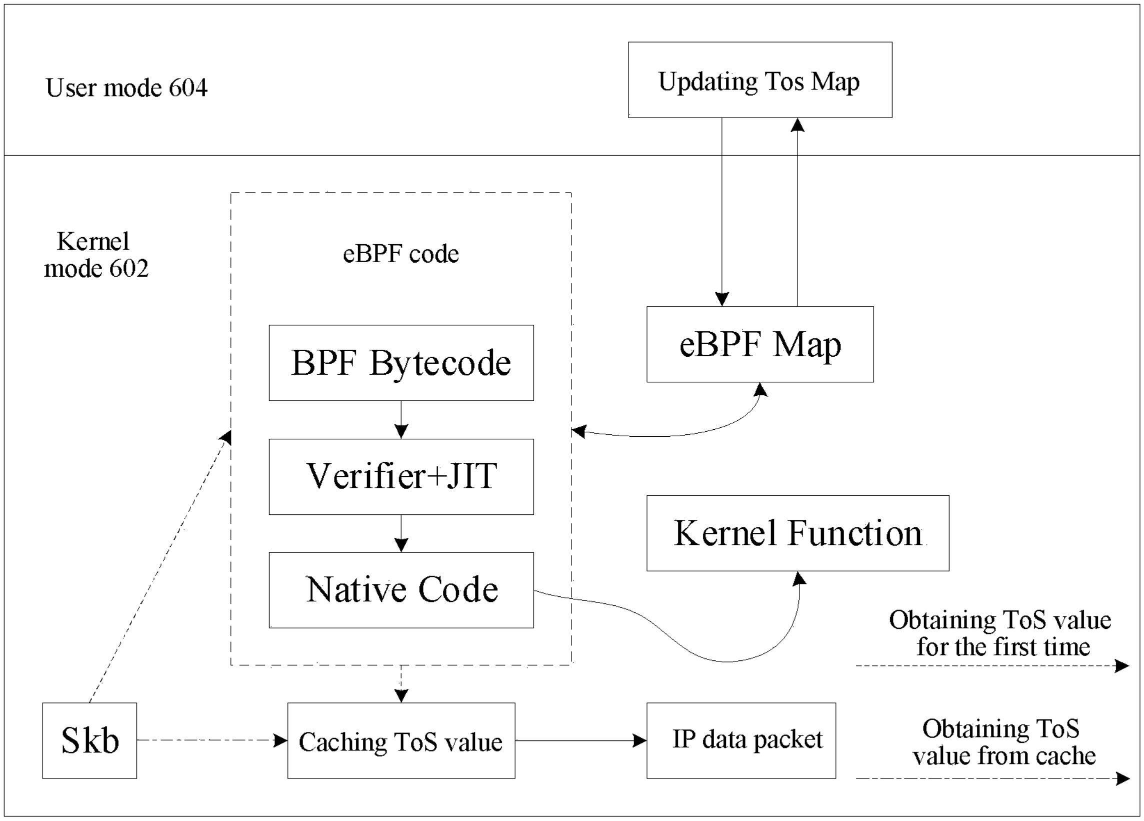
FIG. 6 is a schematic interaction diagram of another solution for quality of service processing solution of a network data packet according to some embodiments of the present disclosure.

As shown in FIG. 6, the Linux kernel is always an ideal place to implement monitoring/observability, network and security. But this is often impractical, because it needs to modify the kernel mode 602 source code or to load the kernel mode 602 module, thus resulting in abstraction layers that are stacked with each other. The extended Berkeley Packet Filter (eBPF) is a revolutionary technology, which may run the sandbox program in the Linux kernel without modifying the kernel mode 602 source code or loading the kernel mode 602 module. By allowing the Linux kernel to be programmable, the infrastructure software may utilize existing layers, making them more intelligent and richer in functions, without continuing to add additional complexity layers to the system.

The eBPF technology results in the development of new-generation tools in the fields of network, security, application configuration/tracking, and performance fault exclusion. These tools do not rely on existing functions of the kernel mode 602, but actively reprogram behaviors during runtime without affecting execution efficiency or security. The data packet filtering module includes "BPF ByteCode", "Verifier+JIT" and "Native Code", etc.

(1) The map (mapping) is one of the most core aspects of the BPF. The code running on the kernel mode 602 and the program loaded with the code may communicate with each other during runtime by using messages.

The BPF mappings are stored keys/values residing in the kernel mode 602, and any BPF program may access them. Programs running in user mode 604 may also access these mappings by using file descriptors. As long as the data size is specified correctly in advance, any type of data may be stored in the mapping. Kernel state 602 treats the key and the value as binary code, and does not care about the content retained in the mapping. The BPF verification procedure includes a variety of protection measures to ensure that the manner of creating and accessing the mapping is secure. Of course, there are many BPF mapping types, such as hash table mapping, array mapping, Cgroup array mapping, etc., which respectively satisfy different scenarios.

(2) The BPF verification program is also a program running on the client system, and therefore, strict examination is performed to ensure that the BPF verification program correctly performs the objectives of work.

The first check performed by the verification program is a static analysis of the code to be loaded by the VM (Virtual Machine). The purpose of the first check is to ensure that the program has an expected result. To this end, the verification program creates a directed acyclic graph (DAG) by using the code. Each instruction analyzed by the verification program will be a node in the graph, and each node is linked to a next instruction. After the verification program generates this graph, it will perform a depth-first search (DFS) to ensure that the program is complete and the code does not contain a dangerous path. This means that it will traverse each branch of the graph until the bottom of the branch to ensure there is no recursive loop.

These are cases that the verifier may reject the code during the first check, requiring the following aspects:

The program does not contain a control loop; that is, to ensure that the program does not fall into an infinite loop, the verification program may reject any type of control loop.

The program does not attempt to execute the instruction that exceeds the maximum instruction number allowed by kernel mode 602. At this time, the executable maximum instruction number is 4096. This limitation is to prevent the BPF from always running. The program does not contain any instructions that cannot be accessed, such as conditions or functions having not be executed ever. This prevents loading of invalid code in the VM, which may also delay the termination of the BPF program. The program does not attempt to cross the border.

The second check performed by the verifier is empty running of the BPF program. This means that the verifier will attempt to analyze each instruction to be executed by the program to ensure that it does not execute any invalid instructions. This execution will also check whether all memory pointers have been properly accessed and de-referenced. Finally, the empty running notifies the verification program of the control flow in the program to ensure that it will reach the BPF_EXIT instruction no matter which control path is used by the program. To this end, the verification program tracks all accessed branch paths in the stack and evaluates them before using the new path, to ensure that it does not access a particular path for more than one time. After these two checks, the verifier considers that the program nay be executed safely.

(3) Hook: Since the eBPF is driven by an event, the eBPF acts on a specific hook; and according to different functions, an XDP, a trace, a socket, or the like are commonly used.

(4) Help function: The eBPF program cannot invoke any kernel mode 602 function (that is, the kernel function shown in FIG. 6); if allowing this, the eBPF program may be bonded to a specific kernel mode 602 version, and the compatibility of the program may be complicated. Instead, the eBPF program may invoke a help function that is a well-known and stable API provided by kernel mode 602.

When the architecture for quality of service processing of the network data packet shown in FIG. 6 is applied to this solution, and the data message Skb of the application arrives at the IP layer from top to bottom, the eBPF code is invoked to obtain the ToS value corresponding to the socket. The value is written into the ToS field of the header of the IP data packet by using the protocol stack code, thus controlling the QoS of the traffic, which specifically includes the following key stages.

(1) Kernel code is modified, which specifically includes the following.

(1.1) The kernel code is extended, a new eBPF system invoking is added, and the ToS map is updated.

(1.2) An eBPF code invoking point is added to ensure that, after first routing, the eBPF code is invoked by the socket to obtain the ToS value and cache the TOS value into the metadata of the socket; and then, the cached value may be directly used in the packaging.

(2) An eBPF program in the kernel mode is run. The program is responsible for reading ToS map data, and returning a correct ToS value according to the mapping logic.

(3) The user mode configuration program is developed; that is, the user mode 604 writes the corresponding relationship between the quadruple and the ToS value into the ToS map by reading the configuration file or through the command line parameter, which needs to support common operations such as adding, deleting, querying, and modifying.

Figure 7:
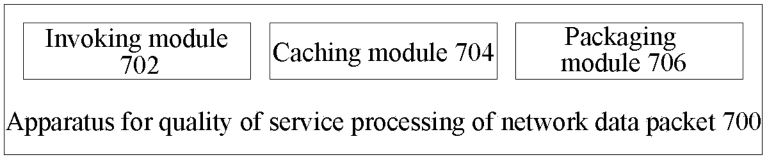
FIG. 7 is a block diagram of an apparatus for quality of service processing of a network data packet according to some embodiments of the present disclosure.

FIG. 7 is a block diagram of an apparatus for quality of service processing of a network data packet according to some embodiments of the present disclosure.

Referring to FIG. 7, the apparatus 700 for quality of service processing of the network data packet may include an invoking module 702, a caching module 704, and a packaging module 706.

The invoking module 702 is configured to invoke the data packet filtering module to obtain a type of service field value corresponding to the socket.

The caching module 704 is configured to cache the type of service field value into the metadata of the socket.

The packaging module 706 is configured to perform a packaging processing on the network data packet after routing based on the cached type of service field value.

In some embodiments of the present disclosure, before invoking the data packet filtering module to obtain the type of service field value corresponding to the socket, it further includes: adding the data packet filtering module in a kernel mode, where the data packet filtering module is configured to update a type of service field chart of the user mode; and, adding an invoking point of the data packet filtering module in a quality of service processing course for the network data packet of a protocol stack in the kernel mode, and invoking the data packet filtering module at the invoking point through the socket after first routing to obtain the type of service field value and cache the type of service field value into the metadata of the socket, where the type of service field chart includes the corresponding relationship between the quadruple of the network data packet and the type of service field value.

In some embodiments of the present disclosure, the apparatus 700 for quality of service processing of the network data packet is further configured to: trigger a configuration file or a command line parameter corresponding to the network data packet in the user mode to determine the corresponding relationship between the quadruple of the network data packet and the type of service field value; and, write the corresponding relationship into the type of service field chart.

In some embodiments of the present disclosure, the apparatus 700 for quality of service processing of the network data packet is further configured to: determine a type of service field value of the network data packet after packaging; and, perform a classification control processing on the network data packet after packaging according to the type of service field value.

In some embodiments of the present disclosure, the data packet filtering module includes an eBPF module.

In some embodiments of the present disclosure, the type of service field value includes a ToS value.

In some embodiments of the present disclosure, the quadruple is a source IP address, a source port, a target IP address, and a target port corresponding to the network data packet.

Since the functions of the apparatus 700 for quality of service processing of the network data packet have been described in detail in the corresponding method embodiments, details are not described here again.

It should be noted that although several modules or units of the device for action execution are mentioned in the above detailed description, such division is not mandatory. In fact, according to embodiments of the present disclosure, the features and functions of two or more modules or units described above may be embodied in one module or unit. Conversely, the features and functions of one module or unit described above may be further divided into a plurality of modules or units.

In some embodiments of the present disclosure, there is further provided an electronic device capable of implementing the above method.

Those skilled in the art can understand that various aspects of the embodiments of the present disclosure may be implemented as a system, a method, or a program product. Therefore, various aspects of the embodiments of the present disclosure may be specifically implemented in the following form: a complete hardware implementation, a complete software implementation (including firmware, microcode, etc.), or an implementation combining hardware and software, which may be collectively referred to here as "circuit", "module", or "system".

The electronic device 800 according to the embodiment of the present disclosure is described below with reference to FIG. 8. The electronic device 800 shown in FIG. 8 is merely an example, and should not impose any limitation on the function and scope of use of the embodiments of the present disclosure.

Figure 8:
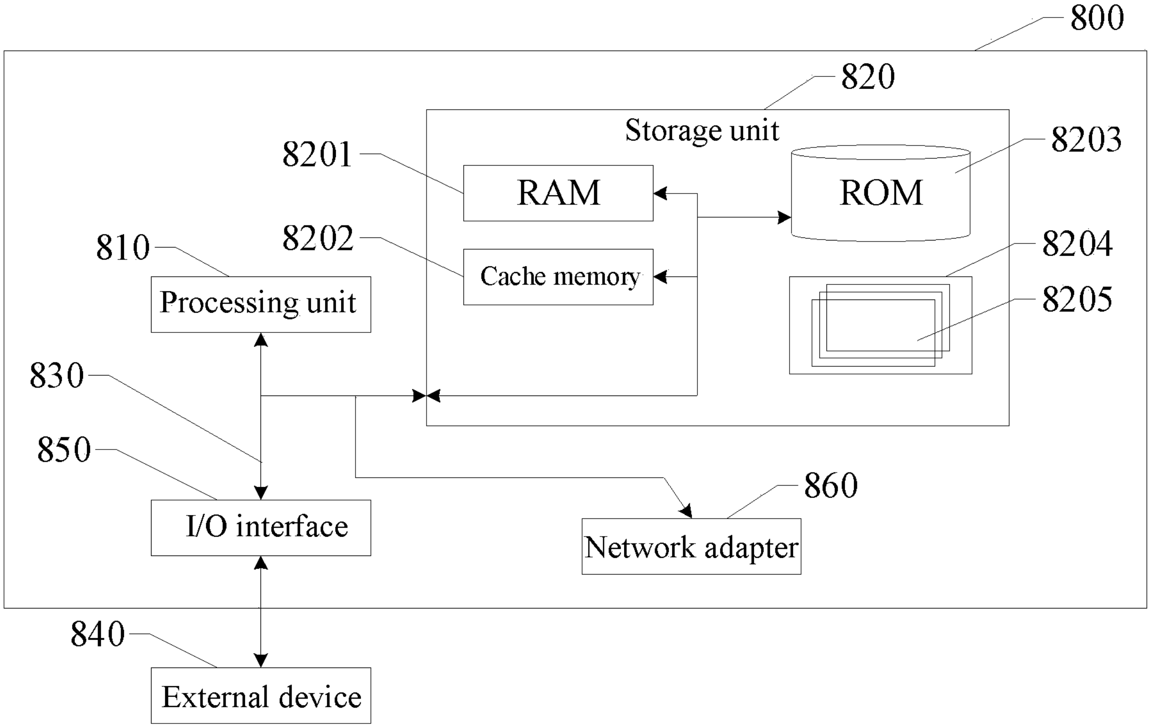
FIG. 8 is a block diagram of an electronic device according to some embodiments of the present disclosure.

As shown in FIG. 8, the electronic device 800 is represented in a form of a general-purpose computing device. The components of the electronic device 800 may include, but are not limited to, at least one processing unit 810, at least one storage unit 820, and a bus 830 connecting different system components (including the storage unit 820 and the processing unit 810).

Among them, the storage unit stores program code, and the program code may be executed by the processing unit 810, so that the processing unit 810 executes the steps of various example embodiments according to the present disclosure described in the foregoing "example method" part of the present specification. For example, the processing unit 810 may perform the method shown in the embodiments of the present disclosure.

The storage unit 820 may include a readable medium in the form of a volatile storage unit, such as a random access storage unit (RAM) 8201 and/or a cache memory storage unit 8202, and may further include a read-only storage unit (ROM) 8203.

The storage unit 820 may further include a program/utility 8204 having a set of (at least one) program modules 8205. Such program module 8205 includes, but is not limited to, an operating system, one or more applications, other program modules, and program data. Each of these examples or a certain combination of these examples may include an implementation of a network environment.

The bus 830 may be one or more of several types of bus structures, including a memory cell bus or a memory cell controller, a peripheral bus, a graphics acceleration port, a processing unit, or a local bus using any of a plurality of bus structures.

The electronic device 800 may also communicate with one or more external devices 840 (e.g. a keyboard, a pointing device, a Bluetooth device, etc.), may also communicate with one or more devices that enable a user to interact with the electronic device 800, and/or may communicate with any device (e.g. a router, modem, etc.) that enables the electronic device 800 to communicate with one or more other computing devices. Such communication may be performed via an input/output (I/O) interface 850. In addition, the electronic device 800 may further communicate with one or more networks (for example, a local area network (LAN), a wide area network (WAN), and/or a public network, such as the Internet) through the network adapter 860. As shown in the figure, the network adapter 860 communicates with other modules of electronic device 800 via bus 830. It should be understood that although not shown in the figure, other hardware and/or software modules may be used in combination with the electronic device 800, including but not limited to: microcode, a device driver, a redundancy processing unit, an external disk drive array, a RAID system, a tape drive, a data backup storage system, or the like.

Through the description of the foregoing implementations, those skilled in the art may easily understand that the example implementations described herein may be implemented by software, or may be implemented by software in combination with necessary hardware. Therefore, the technical solutions according to the embodiments of the present disclosure may be embodied in the form of a software product, and the software product may be stored in a non-volatile storage medium (which may be a CD-ROM, a USB flash disk, a mobile hard disk, etc.) or a network, and includes several instructions to enable a computing device (which may be a personal computer, a server, a terminal device, or a network device, etc.) to perform the method according to the embodiments of the present disclosure.

In some embodiments of the present disclosure, there is further provided a computer-readable storage medium, on which a program product capable of implementing the method described in present specification is stored. In some possible implementations, various aspects of the embodiments of the present disclosure may also be implemented in a form of a program product, including program code. When the program product runs on the terminal device, the program code is configured to enable the terminal device to perform the steps of the various example embodiments according to the present disclosure described in the foregoing "example method" part of the present specification.

The program product for implementing the above method according to embodiments of the present invention may use a portable compact disk read-only memory (CD-ROM) and include program code, and may run on a terminal device, such as a personal computer. However, the program product of the embodiments of the present disclosure is not limited to this. In the present document, the readable storage medium may be any tangible medium containing or storing a program, and the program may be used by or used in combination with an instruction execution system, apparatus, or device.

The program product may employ any combination of one or more readable medium. The readable medium may be a readable signal medium or a readable storage medium. The readable storage medium may be, for example, but is not limited to, an electronic, magnetic, optical, electromagnetic, infrared, or semiconductor system, apparatus, or device, or any combination of the foregoing. A more specific example of a readable storage medium (non-exhaustive list) includes an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

The computer readable signal medium may include a data signal propagated in a baseband or as a part of a carrier, in which readable program code is carried. The propagated data signal may take a variety of forms, including but not limited to an electromagnetic signal, an optical signal, or any suitable combination of the foregoing. A readable signal medium may also be any readable medium other than a readable storage medium, and the readable medium may send, propagate, or transmit a program used by or in connection with an instruction execution system, apparatus, or device.

The program code included in the readable medium may be transmitted by using any suitable medium, including but not limited to wireless, wired, optical cable, RF, or any suitable combination of the foregoing.

The program code for performing operations of embodiments of the present invention may be written in any combination of one or more programming languages, including object-oriented programming languages, such as Java, C++, etc., as well as conventional procedural programming languages, such as "C" language or similar programming languages. The program code may be executed entirely on the user computing device, partially on the user device, as a stand-alone software package, partially on the user computing device and partially on the remote computing device, or entirely on the remote computing device or server. In the case that the remote computing device is involved, the remote computing device may be connected to the user computing device through any type of network, including a local area network (LAN) or a wide area network (WAN), or may be connected to an external computing device (e.g., being connected through the Internet by utilizing an Internet service provider).

In addition, the accompanying drawings are merely schematic descriptions of processing included in the method according to the example embodiments of the present disclosure, rather than for the purpose of limitation. It is easy to understand that the processing shown in the above drawings does not indicate or limit the chronological order of these processes. In addition, it is also easy to understand that these processes may be, for example, performed synchronously or asynchronously in multiple modules.

Other embodiments of the present disclosure will be apparent to those skilled in the art from consideration of the specification and practice of the invention disclosed here. The present application is intended to cover any variations, uses, or adaptations of the present disclosure following the general principles the present disclosure and including the common knowledge or conventional technical means in the art that are not disclosed in the present disclosure. It is intended that the specification and examples be considered as examples only, with a true scope and concept of the present disclosure being indicated by the appended claims.

Industrial Applicability

In the present disclosure, the type of service field value corresponding to the socket is obtained by invoking the data packet filtering module, and the type of service field value is cached into the metadata of the socket, and then a packaging processing is performed on the network data packet after routing based on the cached type of service field value. Compared with the setting according to packet in the related art, the technical solution of the present disclosure implements the setting of the type of service field value according to stream, improving the efficiency and flexibility for updating the type of service field, reducing the overhead required for updating the type of service field value, and reducing the interaction pressure of the network data packet.

What is claimed is:

1. A method for quality of service processing of a network data packet, comprising:

adding a data packet filtering module in a kernel mode, wherein the data packet filtering module is configured to update a type of service field chart of a user mode;

adding an invoking point of the data packet filtering module in a quality of service processing course for a network data packet of a protocol stack in the kernel mode, and invoking the data packet filtering module at the invoking point through a socket after a first routing to obtain a type of service field value corresponding to the socket, wherein the type of service field chart comprises a corresponding relationship between a quadruple of the network data packet and the type of service field value;

caching the type of service field value into metadata of the socket; and performing a packaging processing on the network data packet after routing based on the cached type of service field value.

2. The method according to claim 1, further comprising:

triggering a configuration file or a command line parameter corresponding to the network data packet in the user mode to determine the corresponding relationship; and writing the corresponding relationship into the type of service field chart.

3. The method according to claim 1, further comprising:

determining a type of service field value of the network data packet after packaging; and performing a classification control processing on the network data packet after packaging according to the type of service field value.

4. The method according to claim 1, wherein, the data packet filtering module comprises an extended Berkeley Packet Filter (eBPF) module.

5. The method according to claim 1, wherein, the type of service field value comprises a type of service (ToS) value.

6. The method according to claim 1, wherein, the quadruple comprises a source IP address, a source port, a target IP address, and a target port corresponding to the network data packet.

7. An electronic device, comprising:

a memory; and a processor, coupled to the memory, wherein the processor is configured to, based on an instruction stored in the memory, perform:

adding a data packet filtering module in a kernel mode, wherein the data packet filtering module is configured to update a type of service field chart of a user mode;

adding an invoking point of the data packet filtering module in a quality of service processing course for a network data packet of a protocol stack in the kernel mode, and invoking the data packet filtering module at the invoking point through a socket after a first routing to obtain a type of service field value corresponding to the socket, wherein the type of service field chart comprises a corresponding relationship between a quadruple of the network data packet and the type of service field value;

caching the type of service field value into metadata of the socket; and performing a packaging processing on the network data packet after routing based on the cached type of service field value.

8. The electronic device according to claim 7, wherein the processor is further configured to perform:

triggering a configuration file or a command line parameter corresponding to the network data packet in the user mode to determine the corresponding relationship; and writing the corresponding relationship into the type of service field chart.

9. The electronic device according to claim 7, wherein the processor is further configured to perform:

determining a type of service field value of the network data packet after packaging; and performing a classification control processing on the network data packet after packaging according to the type of service field value.

10. The electronic device according to claim 7, wherein, the data packet filtering module comprises an eBPF module.

11. The electronic device according to claim 7, wherein, the type of service field value comprises a ToS value.

12. The electronic device according to claim 7, wherein, the quadruple comprises a source IP address, a source port, a target IP address, and a target port corresponding to the network data packet.

13. A non-transitory computer-readable storage medium, wherein a program is stored the computer-readable storage medium; when the program is executed by a processor, a method for quality of service processing of a network data packet is implemented, and the method comprises:

adding a data packet filtering module in a kernel mode, wherein the data packet filtering module is configured to update a type of service field chart of a user mode;

adding an invoking point of the data packet filtering module in a quality of service processing course for a network data packet of a protocol stack in the kernel mode, and invoking the data packet filtering module at the invoking point through a socket after a first routing to obtain a type of service field value corresponding to the socket, wherein the type of service field chart comprises a corresponding relationship between a quadruple of the network data packet and the type of service field value;

caching the type of service field value into metadata of the socket; and performing a packaging processing on the network data packet after routing based on the cached type of service field value.

14. The non-transitory computer-readable storage medium according to claim 13, wherein the method further comprises:

triggering a configuration file or a command line parameter corresponding to the network data packet in the user mode to determine the corresponding relationship; and writing the corresponding relationship into the type of service field chart.

15. The non-transitory computer-readable storage medium according to claim 13, wherein the method further comprises:

determining a type of service field value of the network data packet after packaging; and performing a classification control processing on the network data packet after packaging according to the type of service field value.

16. The non-transitory computer-readable storage medium according to claim 13, wherein, the data packet filtering module comprises an eBPF module, and the type of service field value comprises a ToS value.

17. The non-transitory computer-readable storage medium according to claim 13, wherein, the quadruple comprises a source IP address, a source port, a target IP address, and a target port corresponding to the network data packet.

* * * * *